(12) United States Patent
Kawanabe et al.

(10) Patent No.: US 6,989,928 B2
(45) Date of Patent: Jan. 24, 2006

(54) MICROSCOPE APPARATUS

(75) Inventors: Hideyuki Kawanabe, Hachioji (JP); Shinya Sakamoto, Hachioji (JP); Mitsuhiko Saito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 42 days.

(21) Appl. No.: 10/664,640

(22) Filed: Sep. 17, 2003

(65) Prior Publication Data
US 2004/0090670 A1    May 13, 2004

(30) Foreign Application Priority Data
Sep. 19, 2002   (JP)   ............... 2002-273955

(51) Int. Cl.
G02B 21/26   (2006.01)

(52) U.S. Cl. ............... 359/392; 359/384; 359/381; 359/380; 359/368

(58) Field of Classification Search ........... 359/368, 359/388, 381, 384, 392, 393, 380, 394, 391; 250/201.3
See application file for complete search history.

(56) References Cited

U.S. PATENT DOCUMENTS

| | | | |
|---|---|---|---|
| 5,315,080 A * | 5/1994 | Kaczynski et al. | ........... 200/47 |
| 5,517,353 A * | 5/1996 | Ikoh et al. | ................ 359/388 |
| 2003/0179445 A1 * | 9/2003 | Maenle et al. | ............. 359/368 |

FOREIGN PATENT DOCUMENTS

JP    2000-184116 A    6/2000

* cited by examiner

*Primary Examiner*—Thong Nguyen
*Assistant Examiner*—Arnel C. Lavarias
(74) *Attorney, Agent, or Firm*—Frishauf, Holtz, Goodman & Chick, P.C.

(57) ABSTRACT

A microscope apparatus has a driver mounted on a main body of the microscope apparatus, a sensor which detects a stopped state of the driver, a power supply which supplies power to the sensor, a drive controller which controls driving of the driver, and a controller which controls the power supply to the sensor from the power supply in accordance with a drive control signal sent from the drive controller to the driver.

12 Claims, 3 Drawing Sheets

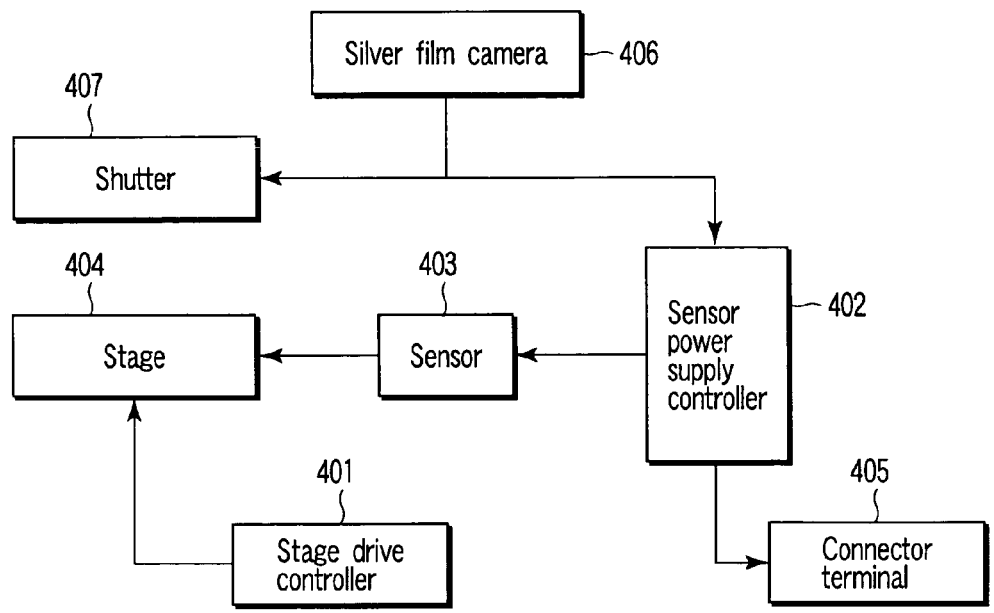
F I G. 5
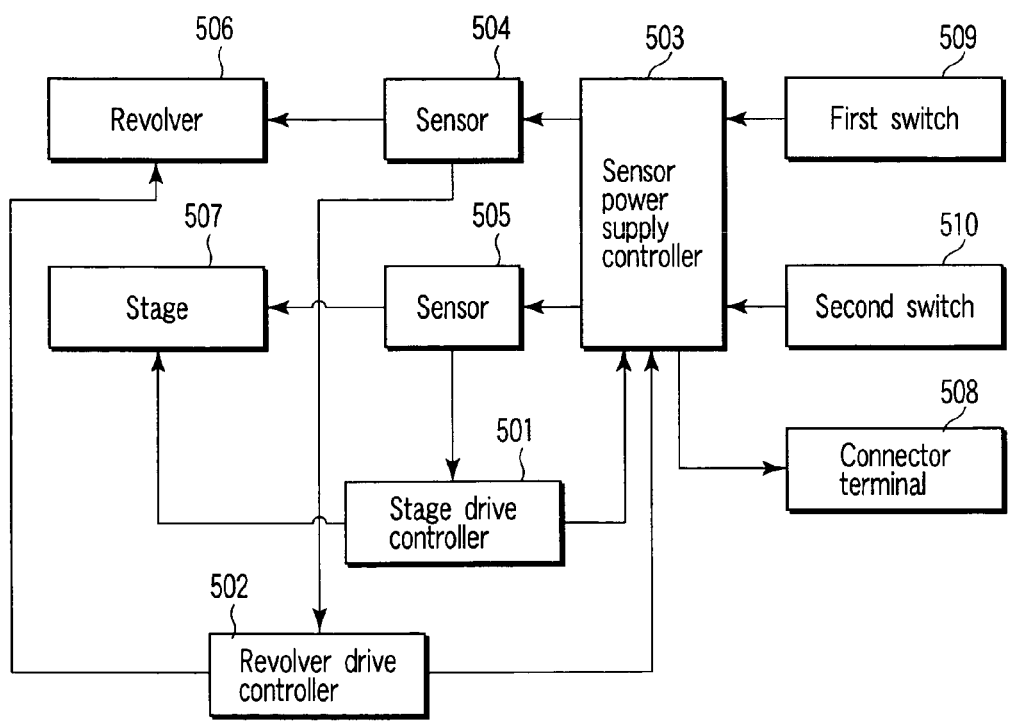
F I G. 6

MICROSCOPE APPARATUS

CROSS-REFERENCE TO RELATED APPLICATIONS

This application is based upon and claims the benefit of priority from the prior Japanese Patent Application No. 2002-273955, filed Sep. 19, 2002, the entire contents of which are incorporated herein by reference.

BACKGROUND OF THE INVENTION

1. Field of the Invention

The invention relates to a microscope apparatus including a sensor which detects a state of a driver such as a stage.

2. Description of the Related Art

Recent microscope apparatuses frequently used include electronic microscopes of the type that electrically controls various drivers that drive, for example, a revolver used to change an objective lens and a stage used to mount a sample as an observation object.

To control the operation of such a driver, it is necessary to detect the current state of the driver by using a sensor provided as a sensor section such as a photo-interrupter or a Hall integrated circuit (IC).

Microscope apparatuses using sensors for detecting the state of drivers include those of the type described hereunder.

A main body of the microscope apparatus has two sensors, namely, an upper limit sensor and a lower limit sensor, which are disposed at a predetermined spacing along a movement direction of a stage. In addition, the main body has a light shield provided in the stage. Upon movement of the stage, the light shield enters an optical axis of a photo-interrupter and thereby blocks the optical path.

When a user operates an operation switch of the main body of the microscope apparatus to drive the stage upward, the light shield enters the optical axis of the photo-interrupter of the upper limit sensor to thereby block the optical path. Thereby, the upper limit sensor becomes the ON state and detects that the stage has been driven up to the upper limit. Conversely, when the stage is driven downward, the light shield enters the optical axis of the photo-interrupter of the lower limit sensor to thereby block the optical path. Thereby, the lower limit sensor becomes the ON state and detects that the stage has been driven down to the lower limit.

In the configuration described above, power is continually supplied to the upper limit sensor and the lower limit sensor, regardless of the detection of the light shield according to the driving of the stage. Therefore, even when the state where the stage is not driven at all, power continually flows to the upper limit sensor and the lower limit sensor.

To overcome the problem, as disclosed in Jpn. Pat. Appln. KOKAI Publication No. 2000-184116, a scheme has been proposed in which an oscillatory circuit is used to supply power to sensors at predetermined intervals and thereby to reduce power consumption.

BRIEF SUMMARY OF THE INVENTION

A microscope apparatus according to the first aspect of the invention is characterized by comprising: a driver mounted on a main body of the microscope apparatus; a sensor which detects a stopped state of the driver; a power supply which supplies power to the sensor; a drive controller which controls driving of the driver; and a controller which controls the power supply to the sensor from the power supply in accordance with a drive control signal sent from the drive controller to the driver.

A microscope apparatus according to the second aspect of the invention is characterized by comprising: a first driver which is mounted on a main body of the microscope apparatus and which is driven by a manual operation or an electrical operation; a first sensor which detects a stopped state of the first driver; a second driver which is mounted on the main body of the microscope apparatus and which is driven only by an electrical operation; a second sensor which detects a stopped state of the second driver; a power supply which supplies power to the first sensor and the second sensor; a drive controller which controls the driving of the second driver; and a controller which controls the power supply to the second sensor from the power supply in accordance with a drive control signal sent from the drive controller to the second driver.

A microscope apparatus according to the third aspect of the invention is characterized by comprising: a driver mounted on a main body of the microscope apparatus; a sensor which detects a stopped state of the driver; a power supply which supplies power to the sensor; an imager which images an observation image acquired by the main body of the microscope apparatus; a state detection section which detects an exposure state of the imager; and a controller which stops the power supply to the sensor depending on the exposure state of the imager, which is detected by the state detection section.

A microscope apparatus according to the fourth aspect of the invention is characterized by comprising: a plurality of drivers mounted on a main body of the microscope apparatus; a plurality of sensors to individually detect stopped states of the plurality of drivers; a power supply which supplies power to the plurality of sensors; and a selecting section which selects at least one of the plurality of sensor to be supplied with power from the power supply.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic view of the configuration of a control system used in the fourth embodiment; and FIG. 6 is a schematic view of the configuration of a fifth embodiment according to the invention.

DETAILED DESCRIPTION OF THE INVENTION

Embodiments of the invention will be described hereinbelow with reference to the accompanying drawings.

Figure 1:
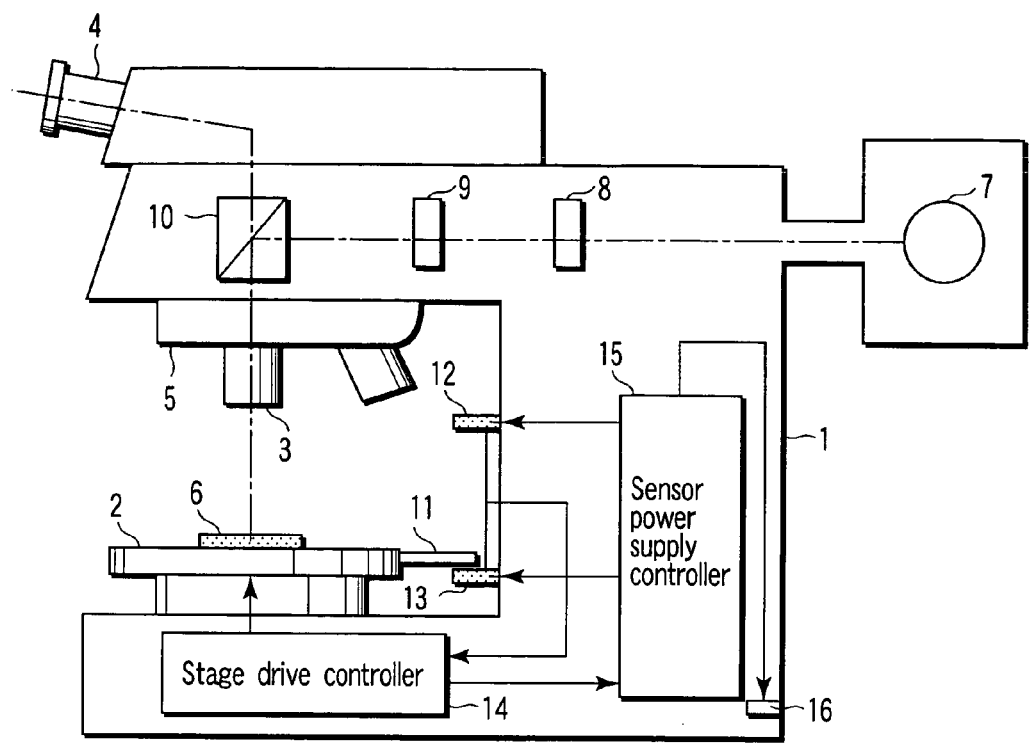
FIG. 1 is a schematic view of the configuration of a first embodiment according to the invention.

FIG. 1 is a schematic view of the configuration of a microscope apparatus to which a first embodiment of the invention is applied.

Referring to FIG. 1, a microscope main body 1 has an electrically-driven stage 2 that can be vertically driven, as a driver. A sample 6 to be microscopically observed is placed on the stage 2.

A revolver 5 is provided above the stage 2. The revolver 5 holds a plurality of objective lenses 3, and selectively change the objective lens 3 to be positioned on the optical axis.

A light source 7 is situated above the microscope main body 1. An aperture diaphragm 8, a view diaphragm 9, and a corner cube 10 are disposed along an optical path of illumination light emitted from the light source 7.

Illumination light emitted from the light source 7 is irradiated onto the sample 6 through the aperture diaphragm 8, the view diaphragm 9, and the corner cube 10. Light reflected from the sample 6 is guided to be incident on an ocular lens 4 through the objective lens 3 and the corner cube 10. Thereby, an observer can observe the sample 6.

The stage 2 is connected to a stage drive controller 14. In response to an external operation, the stage drive controller 14 sends a control signal to a stage drive motor (not shown), whereby the stage 2 is electrically driven in the vertical direction.

In the microscope main body 1, an upper limit sensor 12 and a lower limit sensor 13, individually formed of photo-interrupters, are disposed at a predetermined spacing therebetween along the movement direction of the stage 2.

A light shield 11 is provided to the stage 2. The light shield 11 vertically moves together with the stage 2. Upon entering the optical axis of the photo-interrupter, the light shield 11 blocks the optical path.

The stage drive controller 14 has a switch (not shown) that enables a user to arbitrarily select the upward/downward drive direction of the stage 2 by the stage drive controller 14. Upon a user operation of the switch, a signal directing the upward/downward drive direction of the stage 2 to the stage drive motor (not shown) is output.

Suppose that, in response to a switch operation as described above, the stage 2 is driven upwardly, and the light shield 11 reaches the position of the upper limit sensor 12. In this case, the stage drive controller 14 blocks the optical path of the photo-interrupter, and the upper limit sensor 12 switches to the ON state. Then, the upper limit sensor 12 detects that the sample 6 over the stage 2 has been driven up to a design upper limit at which the sample 6 does not collide with the objective lens 3. A notification of the detection result is then notified to the stage drive controller 14. Upon receipt of the notification, the stage drive controller 14 controls the stage 2 not to further move upward.

Also when an operation of the switch is performed to move the stage 2 downward, operations and control similar to those described above are performed. That is, when the lower limit sensor 13 detects that the stage 2 has been driven down to a design lower limit, a notification of the detection result is notified to the stage drive controller 14. Having received the notification, the stage drive controller 14 controls the stage 2 not to further move downward.

The microscope main body 1 further has a sensor power supply controller 15. The sensor power supply controller 15 controls the power supply to the upper limit sensor 12 and the lower limit sensor 13. Upon termination of a switch operation in the stage drive controller 14 and the movement of the stage 2, the sensor power supply controller 15 controls the power supply to the upper limit sensor 12 and the lower limit sensor 13 to be stopped in accordance with a command received from the stage drive controller 14. Thus, the sensor power supply controller 15 controls the power supply to the upper limit sensor 12 and the lower limit sensor 13 only during operation of the switch of the stage drive controller 14.

The sensor power supply controller 15 is connected to a connector terminal 16. The connector terminal 16 outputs signals individually indicative of the state of the power supply from the sensor power supply controller 15 to the upper limit sensor 12 and the lower limit sensor 13.

The connector terminal 16 can be connected to an external device (not shown) that enables monitoring of the ON/OFF state of power supply, which is controlled by the sensor power supply controller 15. The state of the power supply from the sensor power supply controller 15 to the upper limit sensor 12 and the lower limit sensor 13 can be monitored for each of the upper limit sensor 12 and the lower limit sensor 13.

In the configuration described above, upon operation of the switch of the stage drive controller 14, the sensor power supply controller 15 is activated to commence the power supply to the upper limit sensor 12 and the lower limit sensor 13. In response, the upper limit sensor 12 and the lower limit sensor 13 are individually activated. In addition, the sensor power supply controller 15 sends to the connector terminal 16 signals indicative of the states of power supply to the upper limit sensor 12 and the lower limit sensor 13.

In this state, after a short period of time elapsed from the instance of the switch operation, the stage drive controller 14 outputs a control signal to the stage drive motor (not shown). Thereby, the stage 2 is driven upward or downward.

Upon termination of the operation of the switch of the stage drive controller 14, the stage drive motor (not shown) is deactivated, and the movement of the stage 2 is stopped. Subsequently, after elapse of a short period of time, the stage drive controller 14 sends a signal indicative of the above-described instance also to the sensor power supply controller 15. In response to the signal, the sensor power supply controller 15 controls the power supply to the upper limit sensor 12 and the lower limit sensor 13 to be stopped. In addition, the sensor power supply controller 15 sends a signal indicative of power off also to the connector terminal 16.

As described above, the microscope apparatus is designed to permit the power supply to the upper limit sensor 12 and the lower limit sensor 13, which detect the state of the stage 2, only during the movement of the stage 2. This enables prevention of unnecessary power supply to the upper limit sensor 12 and the lower limit sensor 13. Consequently, power consumption can be reduced, compared to the conventional case in which power is continually supplied to the sensors even while the stage is not driven at all.

Further, signals indicative of states of power supply to the upper limit sensor 12 and the lower limit sensor 13 can be transmitted to the outside. Accordingly, the states of power supply to the individual sensors can be monitored from the outside.

According to the embodiment described above, when the movement of the stage 2 has been stopped by the stage drive controller 14, the sensor power supply controller 15 controls the power supply to the upper limit sensor 12 and the lower limit sensor 13 to be stopped in response to the command issued by the stage drive controller 14. Alternatively, the embodiment may be arranged such that when the stage drive controller 14 controls the stage 2 to be driven, the sensor power supply controller 15 supplies power to the upper limit sensor 12 and the lower limit sensor 13 in response to the command issued by the stage drive controller 14.

A second embodiment of the present invention will be described hereinbelow.

Figure 2:
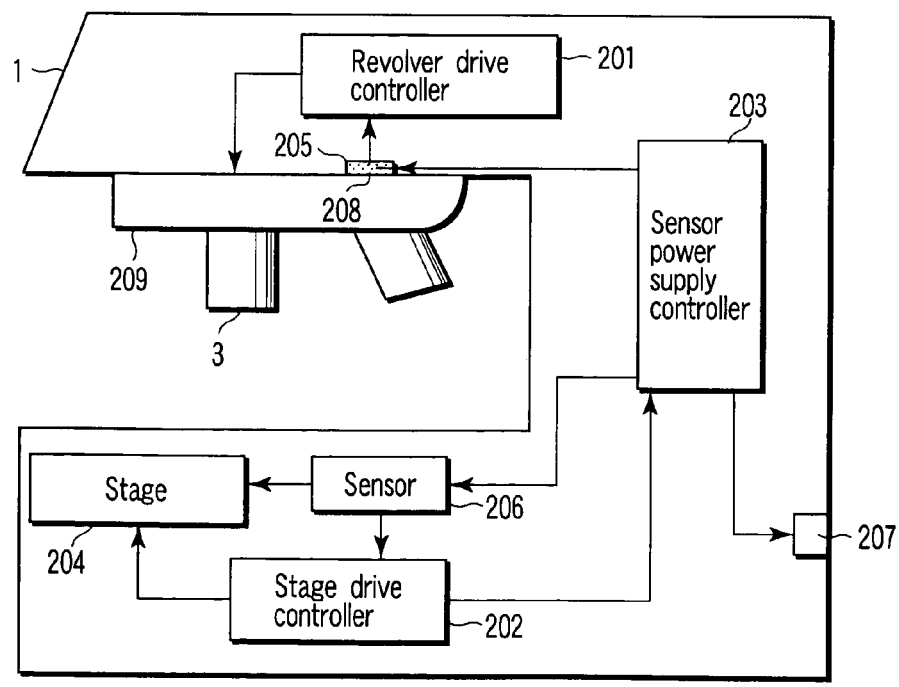
FIG. 2 is a schematic view of the configuration of a second embodiment according to the invention.

FIG. 2 is a schematic view of the configuration of the second embodiment, wherein the same reference numerals as those of FIG. 1 are used for the same portions.

The second embodiment has a feature in having a driver controllable by a manual or electrical operation and a driver controllable only by electrical operation.

The driver controllable only by electrical operation corresponds to the stage 2 described in the first embodiment. Since the configuration relevant to the stage 2 is the same as that in the first embodiment, illustration thereof is omitted from FIG. 2. The driver controllable by a manual or electrical operation corresponds to, for example, an electrically driven revolver.

Referring to FIG. 2, the microscope main body 1 has an electrically-driven revolver 209 to which at most five objective lenses 3 can be fitted. The revolver 209 is connected to a revolver drive controller 201. The revolver drive controller 201 has a switch (not shown) that arbitrarily selects a CW (clockwise) rotational direction of the revolver 209 or a CCW (counterclockwise) rotational direction thereof. Upon a switch operation of the revolver drive controller 201, a signal directing the rotational driving of the revolver 209 is output to a revolver drive motor (not shown). The revolver 209 can be rotationally driven not only by an electrical operation but also by a manual operation in such a manner that, while holding the objective lenses 3 by hand, the overall revolver 209 is rotated.

Five small openings 208 are provided above the revolver 209, corresponding to the positions of the objective lenses 3. Additionally provided there are sensors 205 each formed of a photo-reflector, corresponding to the small openings 208. The sensors 205 are each disposed to match the position of the small opening 208 when the objective lens 3 matches the optical axis. In the state where the sensor 205 matches the position of the small opening 208, the sensor 205 turns ON and sends to the revolver drive controller 201 a signal notifying that the objective lens 3 has matched the position of the optical axis. Upon receipt of the signal from the sensor 205, the revolver drive controller 201 sends to the revolver drive motor (not shown) a signal for deactivating the rotation of the revolver 209 in the notified state.

The stage 204 controllable only by an electrical operation is driven by a stage drive controller 202 in the vertical direction. The drive state of the stage 204 is detected by the sensor 206, and is notified to the stage drive controller 202. In this case, the operations of the stage drive controller 202 and the sensor 206 are the same as those in the first embodiment.

In addition, a sensor power supply controller 203 is provided in the microscope main body 1. The sensor power supply controller 203 controls the power supply to the sensors 205 and 206. Upon receipt of a signal for stopping the movement of the stage 204 from the stage drive controller 202, the sensor power supply controller 203 controls power to the sensor 206 to be stopped. On the other hand, however, the sensor power supply controller 203 always keeps supplying power to the sensor 205, regardless of the drive state of the electrically-driven revolver 209.

The sensor power supply controller 203 is connected to a connector terminal 207. The connector terminal 207 outputs signals individually indicative of the state of the power supply from the sensor power supply controller 203 to the sensors 206 and 205.

The connector terminal 207 can be connected to an external device (not shown) that enables monitoring of the ON/OFF state of power supply from the sensor power supply controller 203 to the sensors 206 and 205.

In the configuration described above, upon receipt of a command for driving the stage 204, the stage drive controller 202 sends a driving signal to the stage drive motor (not shown), and the driving of the stage 204 is then started. Concurrently, the sensor power supply controller 203 receives a signal indicative of the stage drive commencement from the stage drive controller 202. In response, the sensor power supply controller 203 controls power be supplied to the sensor 206, and then outputs to the connector terminal 207 a signal indicative of the state where power is being supplied to the sensor 206.

The sensor power supply controller 203 always keeps supplying power to the sensor 205, regardless of the drive state of the revolver 209, and outputs to the connector terminal 207 a signal indicative that power is being supplied to the sensor 205.

Thereafter, upon receipt of a command for stopping the movement of the stage 204, the stage drive controller 202 sends a stopping signal to the stage drive motor (not shown), and the movement of the stage 204 is then stopped. Concurrently, the sensor power supply controller 203 receives a signal indicative of the stage-drive stopping signal from the stage drive controller 202, and, in response, stops the power supply to the sensor 206. Then, the sensor power supply controller 203 outputs also to the connector terminal 207 a signal indicative that the power supply has been stopped. On the other hand, the sensor power supply controller 203 always keeps supplying power to the sensor 205, regardless of the state where the power supply to the sensor 206 has been stopped following the stop of the driving of the stage 204. Then, the sensor power supply controller 203 outputs also to the connector terminal 207 a signal indicative that power is being continually supplied to the sensor 205.

Thus, the microscope apparatus according to the second embodiment has both the driver (revolver 209) controllable by a manual or electrical operation and the driver (stage 204) controllable only by an electrical operation. Also in this case, in association with the driving of the stage 204, power is supplied only to the sensor 206 corresponding to the stage 204 controllable only by electrical operation. Accordingly, unnecessary power consumption for the sensor 206 in the stopped state of the stage 204 can be reduced, and power consumption in the overall apparatus can be reduced.

In the second embodiment, up to five objective lenses 3 can be attached to the electrically driven revolver 209. However, even with a revolver to which six objective lenses 3 can be attached, similar effects can be expected by providing six small openings 208. Of course, the invention may be applied to a revolver on which any other number of objective lenses 3 can be attached.

A third embodiment of the invention will be described hereinbelow.

A revolver and a stage of a driver in the third embodiment are similar to those in the second embodiment, so that description thereof will be omitted herefrom. In the third embodiment, only portions relative to control systems will be selected from the microscope apparatus configuration and will be described with reference to FIG. 3.

Figure 3:
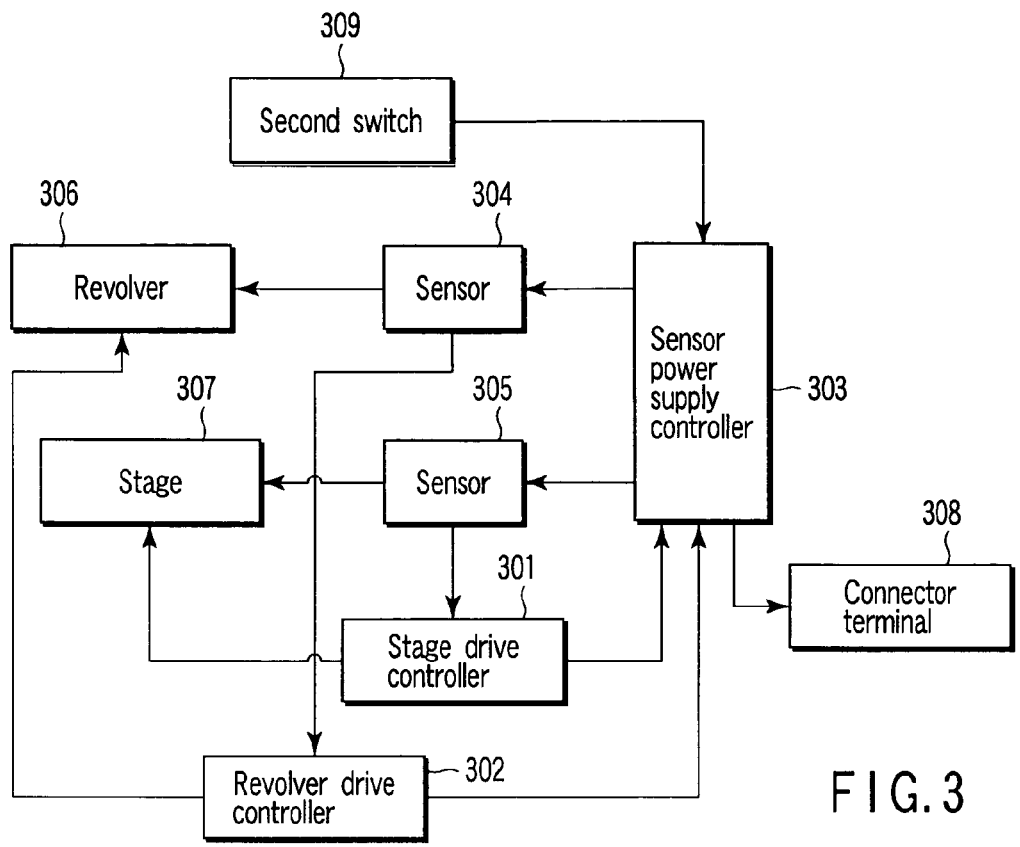
FIG. 3 is a schematic view of the configuration of a third embodiment according to the invention.

Referring to FIG. 3, a stage drive controller 301 controls vertical driving of a stage 307, and outputs a signal indicative of the drive state of the stage 307 to a sensor power supply controller 303. A revolver drive controller 302 controls the rotation of a revolver 306, and outputs a signal indicative of the drive state of the revolver 306 to the sensor power supply controller 303.

The sensor power supply controller 303 controls the power supply to sensors 304 and 305, and sends to a connector terminal 308 signals indicative of the states of power supply to the sensors 304 and 305. The connector terminal 308 can be connected to an external device (not shown) that enables monitoring of the ON/OFF state of power supply from the sensor power supply controller 303 to the sensors 305 and 304.

The sensor 304 is responsible for detecting the state of the revolver 306, and the sensor 305 is responsible for detecting the state of the stage 307.

The sensor power supply controller 303 is connected to a switch 309.

The switch 309 is formed of an element such as an ordinary switch, is associated with the sensor 304. In addition, the switch 309 is responsible for ON/OFF switching in terms of signal transfer to the sensor power supply controller 303.

In response to a signal sent from the switch 309, the sensor power supply controller 303 changes a method of power supply to the sensor 304.

In the above state, when the switch 309 is set to OFF, the sensor power supply controller 303 is enabled to perform ON/OFF control for the power supply to the sensor 304. In specific, power is supplied to the sensor 304 only when a signal at the time of driving of the revolver 306 is sent to the sensor power supply controller 303 from the revolver drive controller 302. When the power supply to the sensor 304 is stopped, a physical stopper controllable only by the revolver drive controller 302 is applied to the revolver 306. When the switch is set to OFF, the stopper enters the hole above the revolver 306 and the revolver 306 cannot be rotated. Upon receipt of rotation instruction, the revolver becomes in a rotatable state by lifting the stopper.

When the switch 309 is set to ON, the sensor power supply controller 303 is enabled to always keep supplying power to the sensor 304.

Only when a signal is received at the time of driving of the stage 307, the sensor power supply controller 303 supplies power to the sensor 305 associated with the stage 307, regardless of the state of the switch 309.

As described above, according to the third embodiment, since the switch 309 is provided, the method of power supply to the sensor 304 for the revolver 306 can be changed by a user's manual operation. This enables appropriate power control to be implemented also for the power supply to the sensor 304 associated with the driver (revolver 306) that is controllable by a manual or electrical operation. Consequently, power consumption in the overall apparatus can be reduced.

A fourth embodiment of the invention will be described hereinbelow.

Figure 4:
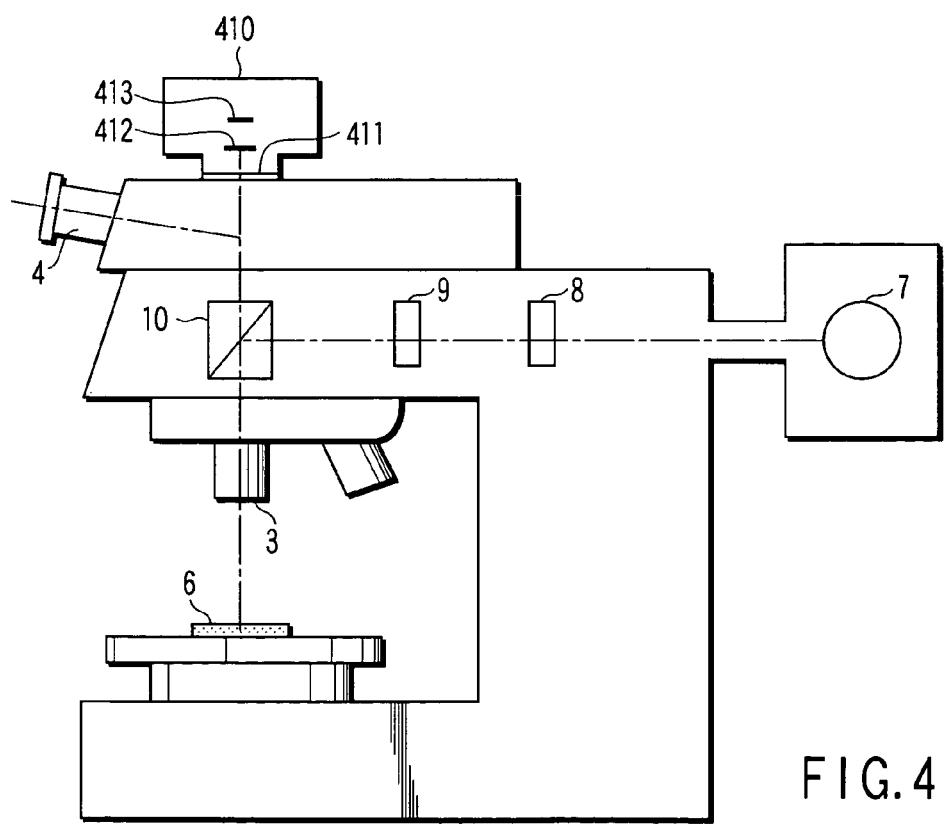
FIG. 4 is a schematic view of the configuration of a fourth embodiment according to the invention.

FIG. 4 is a schematic view of the configuration of the fourth embodiment, in which the same reference numerals denote the same portions in FIG. 1.

The fourth embodiment is characterized in that imaging means is provided in the microscope main body 1.

The microscope main body 1 includes objective lenses 3 and a silver film camera 410 provided as imaging means on an optical path of light reflected from the sample 6. The reflected light is guided to be incident on the side of the ocular lens 4 through the objective lens 3 and the corner cube 10. The silver film camera 410 includes a shutter 411, an imaging lens 412, and a film 413.

In this case, illumination light emitted from the light source 7 is irradiated onto the sample 6 through the aperture diaphragm 8, the view diaphragm 9, and the corner cube 10. The light reflected from the sample 6 travels through the objective lens 3, passes through the corner cube 10 as guided thereby, and is then input to the silver film camera 410. At this time, when the silver film camera 410 is operated to open the shutter 411, the reflected light is irradiated onto the surface of the film 413 through the imaging lens 412 in the silver film camera 410. In this state, an observation image of the sample 6 can be captured by exposing the film 413 to the reflected light for a predetermined time.

Referring to FIG. 5, portions relevant to control systems will be selected from the microscope apparatus configuration and will be described. In the fourth embodiment, only a stage is provided as a driver, as in the first embodiment.

In this configuration, a stage drive controller 401 controls the vertical driving of a stage 404. A sensor power supply controller 402 controls the power supply to a sensor 403, and sends to a connector terminal 405 a signal indicative of the state of power supply to the sensor 403. The connector terminal 405 can be connected to an external device (not shown) that enables monitoring of the ON/OFF state for the power supply from the sensor power supply controller 402 to the sensor 403.

A silver film camera 406 has a switch (not shown) for opening a shutter 407. Upon depression of the switch of the silver film camera 406, a shutter opening signal is output to the shutter 407, and the shutter 407 is thereby opened. Subsequently, after elapse of a predetermined period of time, a shutter closing signal is output to the shutter 407, and the shutter 407 is thereby closed.

In this state, when the switch of the silver film camera 406 is depressed, a signal is sent from the silver film camera 406 to the sensor power supply controller 402. In response, the sensor power supply controller 402 stops the power supply to the sensor 403, and outputs to the connector terminal 405 a signal indicating that the power supply to the sensor 403 has been stopped. Subsequently, after elapse of a short period of time, when a shutter opening signal is sent from the silver film camera 406 to the shutter 407, the shutter 407 is closed. Then, after elapse of a predetermined period of time, when a shutter closing signal is sent from the silver film camera 406 to the shutter 407, the shutter 407 is thereby closed.

In the closing operation of the shutter 407, after a short period of time elapsed from the instance of closure of the shutter 407, a signal is sent from the silver film camera 406 to the sensor power supply controller 402. In response to the signal, the sensor power supply controller 402 commences the power supply to the sensor 403, and concurrently sends to the connector terminal 405 a signal indicating that power is being supplied to the sensor 403.

The fourth embodiment is designed such that, at the time of exposure for capturing an image with the silver film camera 406, the power supply to the sensor 403 is stopped at the time of optical measurement immediately before the exposure. As such, even with an optical sensor such as a photo-interrupter/photo-reflector being used as the sensor 403, since unnecessary light does not enter the inside of the silver film camera 406, a clear sample image can be captured.

A fifth embodiment of the invention will be described hereinbelow.

A revolver and a stage of a driver in the fifth embodiment are similar to those in the third embodiment, so that description thereof will be omitted herefrom. In the fifth embodiment, portions relative to control systems will be selected from the microscope apparatus configuration and will be described with reference to FIG. 6.

Referring to FIG. 6, a stage drive controller 501 controls the vertical driving of a stage 507, and outputs a signal indicative of the operational state of the stage 507 to a sensor power supply controller 503. A revolver drive controller 502 controls the rotation of a revolver 506, and outputs a signal indicative of the operational state of the revolver 506 to the sensor power supply controller 503.

The sensor power supply controller 503 controls the power supply to the sensors 504 and 505, and sends signals indicative of the states of power supply to the sensors 504 and 505 to a connector terminal 508. The connector terminal 508 can be connected to an external device (not shown) that enables monitoring of the ON/OFF state of power supply from the sensor power supply controller 503 to the sensors 504 and 505.

The sensors 504 and 505 detect the states of the revolver 506 and the stage 507.

The sensor power supply controller 503 is connected to a first switch 509 and a second switch 510. The first switch 509 and the second switch 510 are associated with the sensor 504 and the sensor 505, respectively, and are each formed of a switch, for example.

Upon a switch operation of the first switch 509, a signal is sent to the sensor power supply controller 503, and the method of power supply to the sensor 504 is changed. Similarly, upon a switch operation of the second switch 510, a signal is sent to the sensor power supply controller 503, and the method of power supply to the sensor 505 is changed.

In the above state, when the first switch 509 is set to OFF, the sensor power supply controller 503 is enabled to perform ON/OFF control for the power supply to the sensor 504. In specific, power is supplied to the sensor 504 only when a signal at the time of driving of the revolver 506 is sent to the sensor power supply controller 503 from the revolver drive controller 502. When the switch 509 is set to ON, the sensor power supply controller 503 is enabled to always keep supplying power to the sensor 504.

A signal output from the second switch 510 is similar to the signal from the first switch 509. That is, when the second switch 510 is set to OFF, the sensor power supply controller 503 is enabled to perform ON/OFF control for the power supply to the sensor 505. Specifically, power is supplied to the sensor 505 only at the time of driving of the stage 507. When the second switch 510 is set to ON, the sensor power supply controller 503 always keeps supplying power to the sensor 505.

Thus, according to the fifth embodiment, the first switch 509 and the second switch 510 are provided. The first and second switches 509, 510 are used to select the sensors 504 and 505, respectively, to be supplied with power from the sensor power supply controller 503. Thereby, the method of power supply can manually be set and changed for each of the sensors 504 and 505. This feature enhances the degree of adaptability to microscope apparatuses including various drive modes to be even higher. Further, the present embodiment enables optimal setting to be implemented to meet operation positions and purposes desired by individual user. Furthermore, power consumption in the apparatus can be reduced.

While the invention has been described as above with reference to the embodiments, the invention is not limited to the embodiments. In the stage of practicing the invention, various modifications may be made without departing the scope of the invention, as described hereunder.

In each embodiment, the power supply is set to ON/OFF, but the OFF state is not stopping the power supply and may be an extremely small power supply.

The invention has been described with reference to embodiments using the stage and the revolver as the electrically driven drivers. However, the invention may also be adapted to configurations using other electrically driven drivers, such as a view diaphragm and an aperture diaphragm.

In addition, while the invention has been described with reference to the microscopes of the vertical illumination type, the invention may also be adapted to microscopes of a transmitted illumination type.

Further, while each of the embodiments have been described with reference to the microscope apparatuses of an erecting type, the invention may be adapted to microscope apparatuses of an inverted type.

The individual embodiments uses, for example, the photo-interrupter/photo-reflector as the sensor(s). However, an optical sensor(s) of a different type may be used. Furthermore, a magnetic sensor, static capacitance sensor, or mechanical sensor may be used.

While each embodiment uses a connector terminal as an output, it may use a TTL-level output or a Communication terminal such as a USB or RS-232 serial port output or a parallel port output.

Although the embodiment using the silver film camera as the imaging means has been disclosed, a digital camera may be used therefor.

Description has been provided referring to the configurations in which the drive controllers are built into the microscope apparatus main body. However, the configurations may be such that the drivers are controlled by external devices.

While each embodiment uses the switch as the switching means for changing the sensor power supply method, commands externally issued by a personal computer or the like may be used for the switching means.

While each embodiment uses the switches for the stage and revolver operations, commands externally issued by a personal computer or the like may be used for the switching means.

Further, the individual embodiments include inventive techniques in stages. Various aspects of the invention may be extracted by arbitrarily combining the plurality of configuration elements disclosed herein. For example, suppose that even a configuration excluding some of the overall configuration elements is sufficient to enable the problems described herein to be solved and to enable the advantages and effects described herein to be secured. The configuration in this case may be extracted by way of one of the aspects of the invention.

According to the individual embodiments disclosed herein, power is supplied to the sensor for detecting the state of the driver only when the driver is active. Consequently, power consumption in the inactive state of the driver can be reduced.

Appropriate power control can be implemented also for the driver that is to be controlled by a manual operation or electrical operation.

Furthermore, the method of power supply can be changed for each sensor in such a manner that the selecting section selects at least one of the plurality of sensors to be supplied with power from the power supply. As such, the degree of adaptability to microscope apparatuses including various drive modes is high, and settings can be implemented to meet operation positions and purposes desired by individual users.

Moreover, with the imaging means and the power supply being operated in association with each other, unnecessary light from the sensor can be avoided during image capture operation. This contributes also to improvement in quality of captured images.

As described above, according to the embodiments of the invention, microscope apparatuses capable of implementing reduction in power consumption can be provided.

From the individual embodiments, individual aspects of the invention as defined in the appended claims can be extracted. The individual aspects of the invention may either be independently adapted or be adapted in arbitrary combination.

A microscope apparatus according to the first aspect of the invention is characterized by comprising: a driver mounted on a main body of the microscope apparatus; a sensor which detects a stopped state of the driver; a power supply which supplies power to the sensor; a drive controller which controls driving of the driver; and a controller which controls the power supply to the sensor from the power supply in accordance with a drive control signal sent from the drive controller to the driver. In the first aspect, it is preferable that a switch which switches whether to perform or stop the power supply from the power supply to the sensor is further provided.

A microscope apparatus according to the second aspect of the invention is characterized by comprising: a first driver which is mounted on a main body of the microscope apparatus and which is driven by a manual operation or an electrical operation; a first sensor which detects a stopped state of the first driver; a second driver which is mounted on the main body of the microscope apparatus and which is driven only by an electrical operation; a second sensor which detects a stopped state of the second driver; a power supply which supplies power to the first sensor and the second sensor; a drive controller which controls the driving of the second driver; and a controller which controls the power supply to the second sensor from the power supply in accordance with a drive control signal sent from the drive controller to the second driver. In the second aspect, it is preferable that a switch which switches whether to perform or stop the power supply from the power supply to the first sensor, or at least one of: a first switch which switches whether to perform or stop the power supply from the power supply to the first sensor; and a second switch which switches whether to perform or stop the power supply from the power supply to the second sensor is further provided.

A microscope apparatus according to the third aspect of the invention is characterized by comprising: a driver mounted on a main body of the microscope apparatus; a sensor which detects a stopped state of the driver; a power supply which supplies power to the sensor; an imager which images an observation image acquired by the main body of the microscope apparatus; a state detection section which detects an exposure state of the imager; and a controller which stops the power supply to the sensor depending on the exposure state of the imager, which is detected by the state detection section.

A microscope apparatus according to the fourth aspect of the invention is characterized by comprising: a plurality of drivers mounted on a main body of the microscope apparatus; a plurality of sensors to individually detect stopped states of said plurality of drivers; a power supply which supplies power to said plurality of sensors; and a selecting section which selects at least one of said plurality of sensor to be supplied with power from the power supply.

Additional advantages and modifications will readily occur to those skilled in the art. Therefore, the invention in its broader aspects is not limited to the specific details and representative devices, and illustrated examples shown and described herein. Accordingly, various modifications may be made without departing from the spirit or scope of the general inventive concept as defined by the appended claims and their equivalents.

What is claimed is:

1. A microscope apparatus comprising:
   a driver mounted on a main body of the microscope apparatus;
   a sensor which detects a stopped state of the driver;
   a power supply which supplies power to the sensor;
   a drive controller which controls driving of the driver; and
   a controller which controls the supply of power to the sensor from the power supply in accordance with a drive control signal sent from the drive controller to the driver.

2. A microscope apparatus according to claim 1, further comprising a switch which switches whether to perform or stop the supply of power from the power supply to the sensor.

3. A microscope apparatus comprising:
   a first driver which is mounted on a main body of the microscope apparatus and which is driven by a manual operation or an electrical operation;
   a first sensor which detects a stopped state of the first driver;
   a second driver which is mounted on the main body of the microscope apparatus and which is driven only by an electrical operation;
   a second sensor which detects a stopped state of the second driver;
   a power supply which supplies power to the first sensor and the second sensor;
   a drive controller which controls the driving of the second driver; and
   a controller which controls the supply of power to the second sensor from the power supply in accordance with a drive control signal sent from the drive controller to the second driver.

4. A microscope apparatus according to claim 3, further comprising a switch which switches whether to perform or stop the supply of power from the power supply to the first sensor.

5. A microscope apparatus according to claim 3, further comprising at least one of:
   a first switch which switches whether to perform or stop the supply of power from the power supply to the first sensor; and
   a second switch which switches whether to perform or stop the supply of power from the power supply to the second sensor.

6. A microscope apparatus comprising:
a driver mounted on a main body of the microscope apparatus;
a sensor which detects a stopped state of the driver;
a power supply which supplies power to the sensor;
an imager which images an observation image acquired by the main body of the microscope apparatus;
a state detection section which detects an exposure state of the imager; and
a controller which stops the supply of power to the sensor depending on the exposure state of the imager, which is detected by the state detection section.

7. A microscope apparatus comprising:
a movable body mounted on a main body of the microscope apparatus;
an actuator which actuates the movable body;
a sensor which detects a state of the movable body;
a power supply which supplies power to the sensor;
a drive controller which detects one of a driving state and a stopped state of the movable body; and
a sensor power supply controller which controls the supply of the power to the sensor from the power supply in accordance with a drive control signal sent from the drive controller to the actuator.

8. The microscope apparatus according to claim 7, wherein the sensor power supply controller stops the supply of the power to the sensor from the power supply in accordance with the drive control signal sent from the drive controller to the actuator.

9. A microscope apparatus comprising:
a first movable body which is mounted on a main body of the microscope apparatus, and which is drivable by at least one of a manual operation and an electrical operation via a first actuator;
a second movable body which is mounted on the main body of the microscope apparatus, and which is drivable only by an electrical operation via a second actuator;
a first sensor and a second sensor which respectively detect a state of the first movable body and the second movable body;
a power supply which supplies power to the first sensor and the second sensor;
a drive controller which detects one of a driving state and a stopped state of at least the second movable body; and
a sensor power supply controller which controls the supply of the power to the second sensor from the power supply in accordance with a drive control signal sent from the drive controller to the second actuator.

10. The microscope apparatus according to claim 9, further comprising a switch which is switchable to select one of performing and stopping the supply of the power from the power supply to the first sensor.

11. The microscope apparatus according to claim 9, wherein the sensor power supply controller stops the supply of the power to the sensor from the power supply in accordance with the drive control signal sent from the drive controller to the second actuator.

12. A microscope apparatus comprising:
a movable body mounted on a main body of the microscope apparatus;
an actuator which actuates the movable body;
a sensor which detects a state of the movable body;
a power supply which supplies power to the sensor;
an imaging unit which images an observation image obtained with the main body of the microscope apparatus;
a drive controller which detects an exposure state of the imaging unit; and
a sensor power supply controller which controls the supply of the power to the sensor from the power supply in accordance with the exposure state of the imaging unit detected by the drive controller.

* * * * *